United States Patent [19]

Abbestam et al.

[11] Patent Number: 5,000,311
[45] Date of Patent: Mar. 19, 1991

[54] CONVEYOR CHAIN WITH DETACHABLE UPPER PORTION

[75] Inventors: Goran Abbestam, Goteborg; Leif Lachonius, Surte, both of Sweden

[73] Assignee: Atlantic Richfield Company, Los Angeles, Calif.

[21] Appl. No.: 434,850

[22] Filed: Nov. 24, 1989

[30] Foreign Application Priority Data

Nov. 16, 1988 [SE] Sweden .................. 8804125

[51] Int. Cl.⁵ .......................................... B65G 17/12
[52] U.S. Cl. .................. 198/803.01; 198/690.2
[58] Field of Search ............ 198/803.01, 688.1, 690.2, 198/699.1

[56] References Cited

U.S. PATENT DOCUMENTS 3,857,478 12/1974 Meeusen ..................... 198/690.2
3,910,404 10/1975 Henrekson ................. 198/803.01
3,977,322  8/1976 Jaffa .............................. 198/803.01
4,031,825  6/1977 Jaffa .............................. 198/803.01
4,678,078  7/1987 Hastem-Muller ............ 198/690.2
4,809,846  3/1989 Hodlewsky .................. 198/690.2
4,925,013  5/1990 Lapeyre ........................ 198/690.2

Primary Examiner—Joseph E. Valenza
Attorney, Agent, or Firm—Michael E. Martin

[57] ABSTRACT

The invention refers to a conveyor chain forming part of a chain conveyor and incorporates a number of cardanic interconnected links, each of which incorporates an interconnecting lower part (2, 3) and a load carrying upper part (1). The invention is characterized therein that the upper part (1) is equipped with connecting means (4, 5, 6, 8) for detachable fitting of further load carrying members (9), such as carriers, supports for rollers and protecting plates.

4 Claims, 2 Drawing Sheets

CONVEYOR CHAIN WITH DETACHABLE UPPER PORTION

FIELD OF THE INVENTION

The present invention refers to chain conveyors and relates to conveyor chains forming part thereof and having links of improved design.

BACKGROUND OF THE INVENTION

Chain conveyors are commonly known. They usually consist of a girder system incorporating a track, in which a conveyor chain, intended to carry goods to be transported, is driven in forward direction. The conveyor chain is endless and usually consists of a number of links interconnected by cardanic joints. The driving of the chain is effected by means of electric motors, which act upon the chain via different types of transmissions.

The conveyor chains in recent chain conveyors can extend vertically, horizontally and at oblique angles and they can be curved in different directions. Two or more tracks are often arranged to cooperate and to seize the objects to be transported to lift them up to a higher level or to lower them to a lower level. The tracks at their upper side also may be equipped with free-running rollers, whereby goods, which for any reason is retarded, may roll freely in relation to the tracks. Examples of conveyor chains of known type are described in Swedish patent specifications 7906174-3 and 8105758-0.

A frequently occurring problem at chain conveyors of the type described above is that they at various times must convey objects of different types. A conveyor chain with a certain carrying surface then may be improper for conveying goods of other kind than the goods earlier transported. In such a case it may be necessary completely to exchange the conveyor chain, which is of course an extensive operation which rather should be avoided. It therefore since long has been a desideratum to provide a conveyor chain, which can easily be converted thus that it in a satisfactory manner can transport different types of object at various times.

SUMMARY OF THE INVENTION

The problems of the above mentioned, known conveyor tracks have been solved according to the invention and it has been provided a conveyor chain forming part of a chain conveyor and incorporating a number of cardanic interconnected links, each of which incorporates an interconnecting lower part and a load carrying upper part, and which is characterized therein that the upper part is equipped with connecting means for detachable fitting of further load carrying members, such as carriers, supports for rollers and protecting plates.

The connecting means on the conveyor chain according to the invention preferably incorporates one or more rails intended to cooperate with corresponding means on the further load carrying member.

According to the invention it is appropriate that the connecting means also incorporate a resilient shoulder, which by snap action can lock the fitted, additional load carrying member.

Also the connecting means on the conveyor chain according to the invention may consist of rails, which are resilient laterally at the entrance end for the additional load carrying member and it may be equipped with shoulders whereby they can lock the additional load carrying member by snap action.

The links of the conveyor chain according to the invention generally are made from plastic material and it is appropriate that the connecting means are made integral wit the load carrying upper part.

BRIEF DESCRIPTION OF THE DRAWINGS

The invention hereinafter will be further described with reference to the drawings, in which.

DETAILED DESCRIPTION OF THE PREFERRED EMBODIMENT

Figure 1:
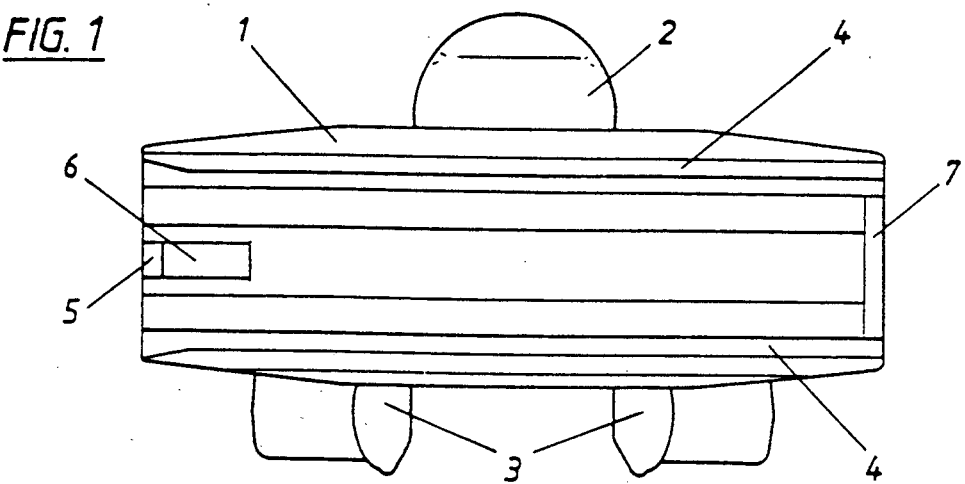
FIG. 1 shows a chain link according to the invention as seen from above.

The chain link according to FIG. 1 consists of a load carrying upper part 1 in form of a plate. This is supported by a partly hidden lower part, which incorporates a link head 2 and two clevis portions 3 provided with throughholes. On the upper side of the plate 1 are provided with two rails 4, which are cast integrally with the plate 1 and with the lower part 2 and 3. The additional, load carrying member is intended to be pushed in on introduction side a should 5 is provided between the rails on a resilient arm 6, such as further shown in FIG. 2. At the right hand side of the plate 1 in FIG. 1 is shown a stop plate 7 preventing the additional load carrying member from being pushed off from the upper part 1. It is possible to exchange this stop 7 for a resilient should similar to that at the opposite side of the plate 1, whereby it will be possible to push on the additional load carrying member from both sides.

Figure 2:
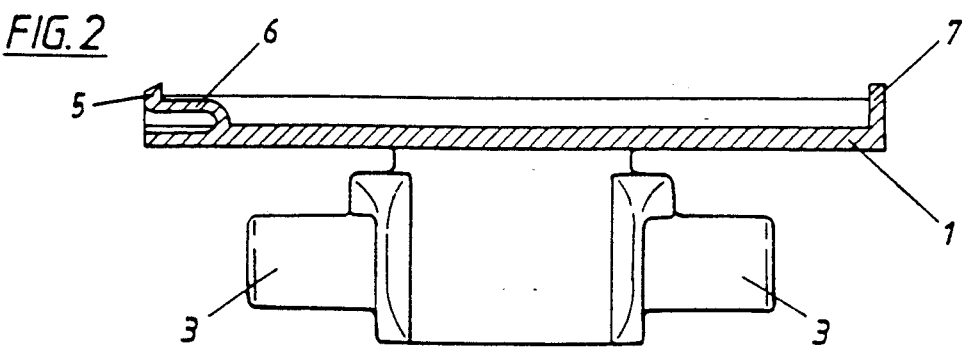
FIG. 2 shows the same chain link seen partly in vertical section.

FIG. 2 shows the chain link according to FIG. 1 in a section through the upper part 1 and through the shoulder 5, which is provided on the resilient arm 6. At the right hand side in the figure is shown the stop 7 and below the plate 1 is shown the clevis portions 3.

Figure 3:
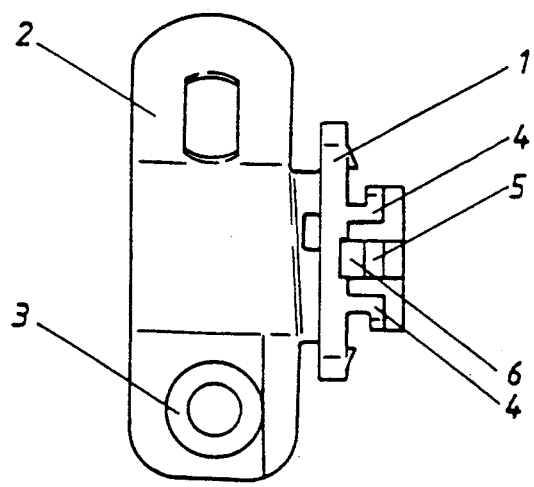
FIG. 3 shows the chain link according to FIG. 1 seen from the side.

FIG. 3 shows the chain link according to FIG. 1 as seen from the side with the plate 1, the link head 2, one of the clevis portions 3, the rails 4 and the shoulder 5 on the resilient arm 6. As can be seen from this figure the shanks of the rails 4 are projecting outward. According to the invention it is also possible to let them project inward, whereby the additional load carrying member has a design corresponding to the inwardly projecting shanks.

Figure 4:
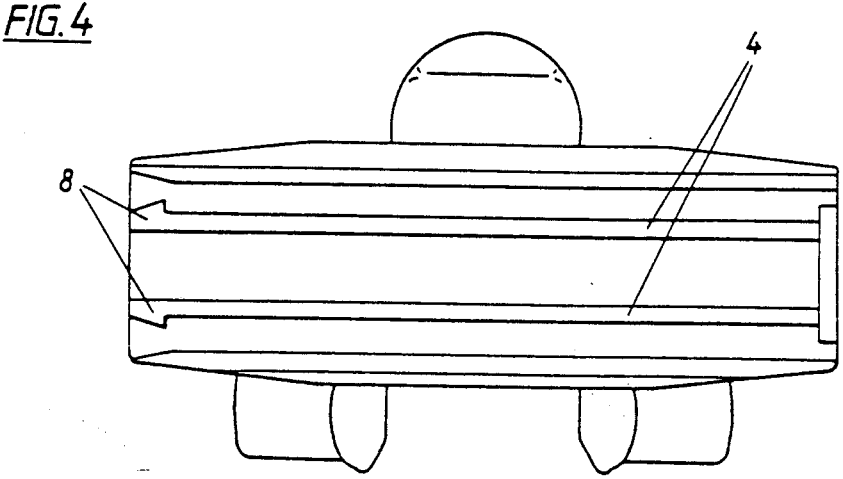
FIG. 4 shows a modification of the chain link shown in FIG. 1.

FIG. 4 shows a modification of the chain link according to FIG. 1. As can be seen from the figure the shoulder 5 on the resilient arm 6 has been excluded and the ends of the rails 4 have been made laterally resilient instead. They also have been equipped with hook members 8 intended to cooperate with the additional load carrying member and to lock this after it has been pushed in position. It also should be pointed out that the rails 4 can be made slightly different, thus that the additional load carrying portion can be introduced in one manner only.

Figure 5:
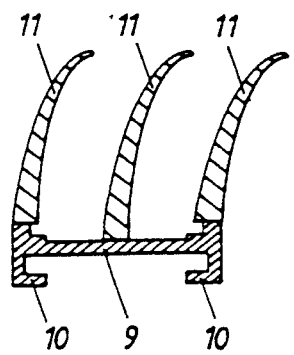
FIG. 5 shows one of the additional, load carrying members seen from the side.

FIG. 5 shows an embodiment of an additional load carrying member as seen from the side. This consists of a rather hard carrier 9 having a mainly U-shaped profile and inwardly folded edges 10. This carrier part is adapted to be pushed inward on the rails 4. At the upper side of the carrier 9 has been provided softer, elongated blades 11, preferably of rubber or plastic material. They may be extruded together with the carrier part, which may be of other material or they may be fitted in other appropriate ways, e.g. by gluing or by means of dovetail grooves. The blades in the present case are intended to cooperate with the blades of a corresponding conveyor track and softly to seize the objects to be conveyed.

In addition to the blades 11 shown in FIG. 5 it is possible to fit other upper parts, e.g. felt or cloth, which in a very lenient manner can convey objects vulnerable to scratching and the like. In such a case it is appropriate that the carrying part 9 is made from aluminum or the like, upon which textiles can be glued easily. Otherwise the carrier plate 9 is usually made from plastic material.

Figure 6:
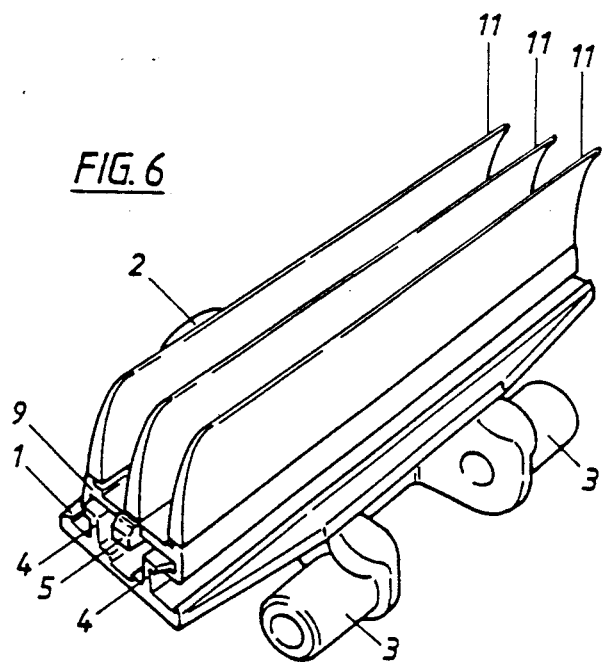
FIG. 6 shows in perspective a chain link according to the invention having an additional, load carrying member fitted thereto.

FIG. 6 finally shows a cardan link with an additional load carrying member according to FIG. 5 fitted thereto. As can be seen from this figure the additional load carrying member can swiftly and easily be pushed in on the cardan link and as easily be removed without the necessity of otherwise making anything to the chain.

By the present invention it thus has been provided a conveyor chain, which is universal in the sense that it can be used for conveying quite different objects and during quite different conditions. To alter the conveyor from transport of a certain goods to another type of goods or to substitute additional load carrying members on the track is very simple. It thereby also has been achieved the advantage that the stock-keeping for conveyor tracks can be simpler. The conveyor chain itself can be standardized and it is required only one type of chain links, on which desired additional load carrying members can be fitted.

The invention is not limited to the embodiments shown but can be varied within the scope of the claims.

What is claimed is:

1. A link for a conveyor chain comprising a lower base part 2,3 and an upper part 1 and means for detachably mounting a load carrying member including laterally extending rail means projecting from said upper part 1, abutment means at one end of said upper part 1 engageable with said load carrying member and at least one flexible locking element at the opposite end defining a releasable locking member.

2. A conveyor chain as claimed in claim 1, characterized therein, that the connecting means incorporate a resilient shoulder (5), which by snap-action is adapted to lock the fitted additional load carrying member (9).

3. A conveyor chain as claimed in claim 1 characterized therein, that the connecting means incorporate rails (4), which are resilient laterally at the entrance end for the additional load carrying member (9) and equipped with shoulder (8), whereby they can lock the additional load carrying member (9) by snap-action.

4. A conveyor as claimed in claim 1 characterized therein, that the connecting means (4, 5, 6, 8) are made integral with the load carrying upper part (1).

* * * * *

UNITED STATES PATENT AND TRADEMARK OFFICE
CERTIFICATE OF CORRECTION

PATENT NO. : 5,000,311

DATED : March 19, 1991

INVENTOR(S) : Abbestam etal

It is certified that error appears in the above-identified patent and that said Letters Patent is hereby corrected as shown below:

On the title page: Assignee should read as follows --SKF Specialty Products AB, Goteborg Sweden--.

On the title page: before item [57] Abstract, the Attorney, Agent, Firm, should read as follows --Eugene E. Renz, Jr.--.

Signed and Sealed this

Eighth Day of December, 1992

Attest:

DOUGLAS B. COMER

Attesting Officer

Acting Commissioner of Patents and Trademarks